United States Patent
Chen et al.

(10) Patent No.: US 11,196,675 B2
(45) Date of Patent: Dec. 7, 2021

(54) FLEXIBLE-ETHERNET DATA PROCESSING METHOD AND RELATED DEVICE

(71) Applicant: HUAWEI TECHNOLOGIES CO., LTD., Guangdong (CN)

(72) Inventors: Xingyao Chen, Shenzhen (CN); Xiaojun Zhang, Shenzhen (CN); Shuai Xiao, Wuhan (CN); Renlei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/861,698

(22) Filed: Apr. 29, 2020

(65) Prior Publication Data

US 2020/0259754 A1 Aug. 13, 2020

Related U.S. Application Data

(63) Continuation of application No. PCT/CN2018/111832, filed on Oct. 25, 2018.

(30) Foreign Application Priority Data

Oct. 31, 2017 (CN) .......................... 201711050171.5

(51) Int. Cl.
*H04L 12/825* (2013.01)
*H04L 12/851* (2013.01)
*H04L 12/931* (2013.01)

(52) U.S. Cl.
CPC .......... *H04L 47/25* (2013.01); *H04L 47/2483* (2013.01); *H04L 49/351* (2013.01)

(58) Field of Classification Search
CPC ... H04L 47/25; H04L 47/2483; H04L 49/351; H04L 12/413; H04J 3/0647; H04J 3/1658; H04J 2203/0085
See application file for complete search history.

(56) References Cited

U.S. PATENT DOCUMENTS

| 7,286,525 B1 | 10/2007 | Laor et al. |
| 7,977,976 B1 * | 7/2011 | Tang ..................... H04L 7/0045 |
| | | 326/94 |

(Continued)

FOREIGN PATENT DOCUMENTS

| CN | 102891813 B | 9/2015 |
| CN | 106612220 A | 5/2017 |

(Continued)

OTHER PUBLICATIONS

IEEE Std 802.3-2015, IEEE Standard for Ethernet, IEEE Computer Society, Sponsored by the LAN/MAN Standards Committee, Approved Sep. 3, 2015, 4017 pages.

(Continued)

*Primary Examiner* — Chi H Pham
*Assistant Examiner* — Vladislav Y Agureyev
(74) *Attorney, Agent, or Firm* — Fish & Richardson P.C.

(57) ABSTRACT

The present disclosure relates to flexible-Ethernet data processing methods and devices. One example method includes acquiring a to-be-switched first client service flow, where the first client service flow is a service flow suitable for transmission on a flexible Ethernet, performing first rate adaptation from a source clock domain to a target clock domain on the first client service flow to obtain a second client service flow that matches the target clock domain, and performing serial-to-parallel conversion on the second client service flow in the target clock domain to obtain a parallel client slot flow.

20 Claims, 7 Drawing Sheets

(56) References Cited

U.S. PATENT DOCUMENTS

| | | | |
|---|---|---|---|
| 8,503,470 B2* | 8/2013 | Narvaez | H04J 3/062 370/419 |
| 8,811,183 B1* | 8/2014 | Anand | H04L 45/24 370/237 |
| 8,830,993 B1* | 9/2014 | Dublin | H04L 49/00 370/376 |
| 2003/0133447 A1* | 7/2003 | Benayoun | H04L 49/351 370/360 |
| 2007/0206946 A1* | 9/2007 | Beshai | H04J 14/08 398/4 |
| 2008/0240225 A1* | 10/2008 | Zavadsky | H04J 4/005 375/240 |
| 2009/0164827 A1* | 6/2009 | Komninakis | H03L 7/00 713/500 |
| 2009/0262788 A1* | 10/2009 | Yang | H04B 7/06 375/141 |
| 2011/0185241 A1* | 7/2011 | Erickson | G06F 30/34 714/724 |
| 2013/0044028 A1* | 2/2013 | Lea | H01Q 21/065 342/359 |
| 2015/0055664 A1 | 2/2015 | Kanonakis et al. | |
| 2015/0229438 A1* | 8/2015 | Le Taillandier De Gabory | H04L 1/0041 398/182 |
| 2016/0294990 A1* | 10/2016 | Cao | H04L 1/0083 |
| 2017/0005742 A1* | 1/2017 | Gareau | H04L 25/49 |
| 2018/0070157 A1* | 3/2018 | Menard | G02B 6/3518 |
| 2018/0095910 A1* | 4/2018 | Kulick | G06F 13/4068 |
| 2018/0159785 A1 | 6/2018 | Wu et al. | |

FOREIGN PATENT DOCUMENTS

| | | |
|---|---|---|
| CN | 106788855 A | 5/2017 |
| CN | 106850465 A | 6/2017 |
| CN | 105009540 B | 6/2018 |
| EP | 3113502 A1 | 1/2017 |

OTHER PUBLICATIONS

Optical Internetworking Forum, "Flex Ethernet Implementation Agreement," IA # OIF-FLEXE-01.0, Mar. 2016, 31 pages.

PCT International Search Report and Written Opinion issued in International Application No. PCT/CN2018/111832 dated Jan. 31, 2019, 15 pages (with English translation).

Office Action issued in Chinese Application No. 201711050171.5 dated Aug. 27, 2020.

Anonymous, "Flex Ethernet Implementation Agreement," OIF, Optical Internetworking Forum, Jun. 21, 2017, 35 pages.

EPO Extended European Search Report issued in European Application No. 18874666.3 dated Feb. 12, 2020, 9 pages.

* cited by examiner

FLEXIBLE-ETHERNET DATA PROCESSING METHOD AND RELATED DEVICE

CROSS-REFERENCE TO RELATED APPLICATIONS

This application is a continuation of International Application No. PCT/CN2018/111832, filed on Oct. 25, 2018, which claims priority to Chinese Patent Application No. 201711050171.5, filed on Oct. 31, 2017. The disclosures of the aforementioned applications are hereby incorporated by reference in their entireties.

TECHNICAL FIELD

The present invention relates to the field of computer technologies, and in particular, to a flexible-Ethernet data processing method and a related device.

BACKGROUND

With continuous development of computer technologies, a restriction that media access control layer (Media Access Control, MAC) interfaces of a native Ethernet (Native Ethernet) need to be bonded to a corresponding quantity of physical layer (Physical Layer, PHY) interfaces significantly reduces flexibility of the Ethernet. Therefore, a flexible Ethernet (Flexbile Ethernet, FlexE) technology is introduced.

During data switching on a FlexE, a client service flow (client) may be used as a switching processing object. When the client service flow is processed, each signal transmitted in a FlexE device may be a client service flow, thereby directly implementing crossing of the signals of the client service flows.

However, when a bandwidth of the foregoing client service flow falls in a dynamic range and is configurable, a switching circuit needs to be designed according to a maximum bandwidth supported by each client service flow. For example, for five client service flows from a same PHY interface whose bandwidth capacity is 100 G, a bandwidth range of each client service flow is [5 G, 100 G]. Therefore, the switching circuit needs to be designed according to a bandwidth capacity of 5×100 G. In other words, a switching capacity of the switching circuit needs to reach 500 G. However, in actual use, due to a restriction on a bandwidth of the PHY interface, utilization of the switching capacity of the switching circuit can reach at most the bandwidth capacity of the PHY interface (for example, the bandwidth capacity 100 G of the PHY interface) at a same moment. Therefore, a speedup factor (the switching capacity provided by the switching circuit/an actually used switching capacity of the switching circuit) of the switching circuit is rather large, and excessive circuit resources are also consumed, resulting in unnecessary waste of resources.

SUMMARY

A technical problem to be resolved in this application is how to obtain a proper speedup factor of a switching circuit to avoid waste of circuit resources.

According to a first aspect, this application provides a flexible-Ethernet data processing method, where the method includes: acquiring a to-be-switched first client service flow, where the first client service flow is a service flow suitable for transmission on a flexible Ethernet, for example, a service flow that meets a flexible Ethernet transmission standard; performing first rate adaptation from a source clock domain to a target clock domain on the first client service flow, to obtain a second client service flow that matches the target clock domain; and performing serial-to-parallel conversion on the second client service flow in the target clock domain, to obtain a parallel client slot flow.

The source clock domain may represent a clock domain corresponding to an initial source of the first client service flow.

It can be learned that, by implementing the method provided in the first aspect, because the obtained client slot flow includes a slot and each slot has a fixed capacity, and because the client slot flow is limited by a bandwidth of an input interface and a total capacity of the client slot flow in a switching circuit at a same moment is within a bandwidth capacity of the input interface, when a switching capacity that the switching circuit can provide is designed, a total capacity of the switching circuit is designed based on the capacity of the client slot flow. In this way, a proper speedup factor of the switching circuit can be acquired, avoiding waste of circuit resources.

In an embodiment, a bandwidth capacity of the client slot flow obtained through the serial-to-parallel conversion may be the same as a bandwidth capacity of the second client service flow, or a bandwidth capacity of the client slot flow obtained through the serial-to-parallel conversion may be different from a bandwidth capacity of the second client service flow and is determined based on both a slot bandwidth standard and the bandwidth capacity of the second client service flow.

In an optional implementation, after the performing serial-to-parallel conversion on the second client service flow in the target clock domain, to obtain a parallel client slot flow, the method further includes: performing space division switching on the parallel client slot flow, and outputting a parallel client slot flow obtained after the space division switching; and performing serial-to-parallel conversion on the parallel client slot flow obtained after the space division switching, to restore, to the second client service flow, the parallel client slot flow obtained after the space division switching.

It can be learned that, by implementing the foregoing optional implementation, the parallel client slot flow may be restored to the second client service flow. This ensures that an output object is still a client service flow, so that a subsequent process of the client service flow is not affected.

In an optional implementation, the acquiring a to-be-switched first client service flow includes: acquiring an initial service flow; and if the initial service flow meets a flexible Ethernet transmission condition, determining that the initial service flow is the to-be-switched first client service flow, where a source of the initial service flow is used as a standard for determining whether the initial service flow meets a flexible Ethernet transmission condition.

In an optional implementation, if the initial service flow does not meet the flexible Ethernet transmission condition, first code conversion is performed on the initial service flow according to a flexible Ethernet standard, to obtain the to-be-switched first client service flow.

It can be learned that implementing the forgoing optional implementation can ensure that the first client service flow is suitable for transmission on the flexible Ethernet.

In an optional implementation, the performing first rate adaptation from a source clock domain to a target clock domain on the first client service flow, to obtain a second client service flow that matches the target clock domain includes: performing the first rate adaptation from the source clock domain to the target clock domain on the first client service flow according to a rate adaptation standard, to obtain the second client service flow that matches the target clock domain, where the rate adaptation standard includes an IEEE 802.3 standard.

It can be learned that, by implementing the foregoing optional implementation, during large-scale networking based on the flexible Ethernet, rate adaptation may be performed according to the rate adaptation standard including the IEEE 802.3 standard. This facilitates connectivity between devices of different vendors, thereby implementing the large-scale networking.

In an optional implementation, after the parallel client slot flow obtained after the space division switching is restored to the second client service flow, the method further includes: performing second rate adaptation on the second client service flow, and sending the second client service flow that has undergone the second rate adaptation.

The second rate adaptation represents rate adaptation from the target clock domain to a destination clock domain.

It can be learned that implementing the foregoing optional implementation can ensure that a clock domain of the sent second client service flow matches the destination clock domain, to facilitate transmission at a transmission destination.

In an optional implementation, after the performing parallel-to-serial conversion on the parallel client slot flow obtained after the space division switching, to restore, to the second client service flow, the parallel client slot flow obtained after the space division switching, the method further includes: performing second rate adaptation and second code conversion on the second client service flow, to restore the second client service flow to the initial service flow; and sending the initial service flow.

It can be learned that implementing the foregoing optional implementation can ensure that the clock domain of the sent second client service flow matches the destination clock domain, and when a transmission object at a destination is not the client service flow, the second client service flow is restored to the initial service flow through code conversion, to facilitate transmission at the transmission destination.

In an optional implementation, the performing space division switching on the parallel client slot flow includes: performing the space division switching on the parallel client slot flow based on a preset crossing configuration table, where the preset crossing configuration table includes a correspondence between an input interface and an output interface of the parallel client slot flow.

It can be learned that implementing the foregoing optional implementation can ensure the correspondence between the input interface and the output interface of the client slot flow during a switching process, so that the switching may be performed orderly.

In an optional implementation, the parallel client slot flow corresponds to a slot flow identifier, and the performing parallel-to-serial conversion on the parallel client slot flow obtained after the space division switching includes: determining a slot flow identifier corresponding to the parallel client slot flow obtained after the space division switching; and sorting, according to the corresponding slot flow identifier, the parallel client slot flow obtained after the space division switching, and performing, based on a result of the sorting, parallel-to-serial conversion on a plurality of parallel client slot flows obtained after the space division switching.

It can be learned that, by implementing the foregoing optional implementation, the parallel-to-serial conversion may be performed based on the slot flow identifiers. This prevents chaos in a parallel-to-serial conversion process, thereby improving an order of the parallel-to-serial conversion process.

According to a second aspect, a switching device is provided, where the switching device has a function for implementing flexible-Ethernet data processing according to the first aspect or the possible implementations of the first aspect. The function may be implemented by using hardware, or may be implemented by hardware executing corresponding software. The hardware or the software includes one or more modules corresponding to the function. The module may be software and/or hardware. Based on a same inventive concept, for a problem-resolving principle and beneficial effects of the switching device, refer to the first aspect and the possible method implementations of the first aspect and beneficial effects thereof. Therefore, for implementation of the switching device, refer to the first aspect and the possible method implementations of the first aspect. Repeated content is not described again.

According to a third aspect, a switching device is provided, where the switching device includes: a memory, configured to store one or more programs; and a processor, configured to invoke the program stored in the memory, to implement the solution in the method design of the first aspect. For a problem-resolving implementation and beneficial effects of the switching device, refer to the first aspect and the possible method implementations of the first aspect and the beneficial effects thereof. Repeated content is not described again.

According to a fourth aspect, a computer readable storage medium is provided. The computer storage medium stores a computer program, and the computer program includes a program instruction. When the program instruction is executed by a processor, the processor is enabled to perform the method according to the first aspect and the possible method implementations of the first aspect, and the beneficial effects. Repeated content is not described again.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following describes the embodiments of the present invention with reference to the accompanying drawings in the embodiments of the present invention.

A FlexE flexible Ethernet technology is an interface technology that implements isolated service carrying and network slicing. A flexible Ethernet has features such as a flexible and adjustable bandwidth, data isolation, and compliance with 5 G services, and is no longer limited by a restriction that MAC interfaces of a native Ethernet (Native Ethernet) need to be bonded to a corresponding quantity of PHY interfaces. Instead, the MAC interface and the PHY interface are isolated so that they are not directly related. Consequently, the flexible Ethernet can support various MAC rates, and flexibility of the flexible Ethernet is greatly improved in comparison with the native Ethernet. Therefore, the flexible Ethernet is widely recognized by mainstream operators and suppliers.

During data switching on the flexible Ethernet, a slot (slot), a client service flow (client), or the like may be used as a switching processing object. When the client service flow is used as the switching processing object, the client service flow may be carried by using a flexible Ethernet group (FlexE group).

Specifically, a FlexE group may carry a plurality of client service flows that are transmitted in a specified slot (one or more slots) in the FlexE group. One FlexE group may include one or more PHY interfaces.

It should be further noted that, in comparison with the native Ethernet, a flexible Ethernet shim sublayer (FlexE SHIM) is added between an L2 (MAC) and an L1 (PHY) of the flexible Ethernet, and the FlexE shim sublayer is a sublayer that maps or demaps a client service flow carried in the FlexE group.

Figure 1:
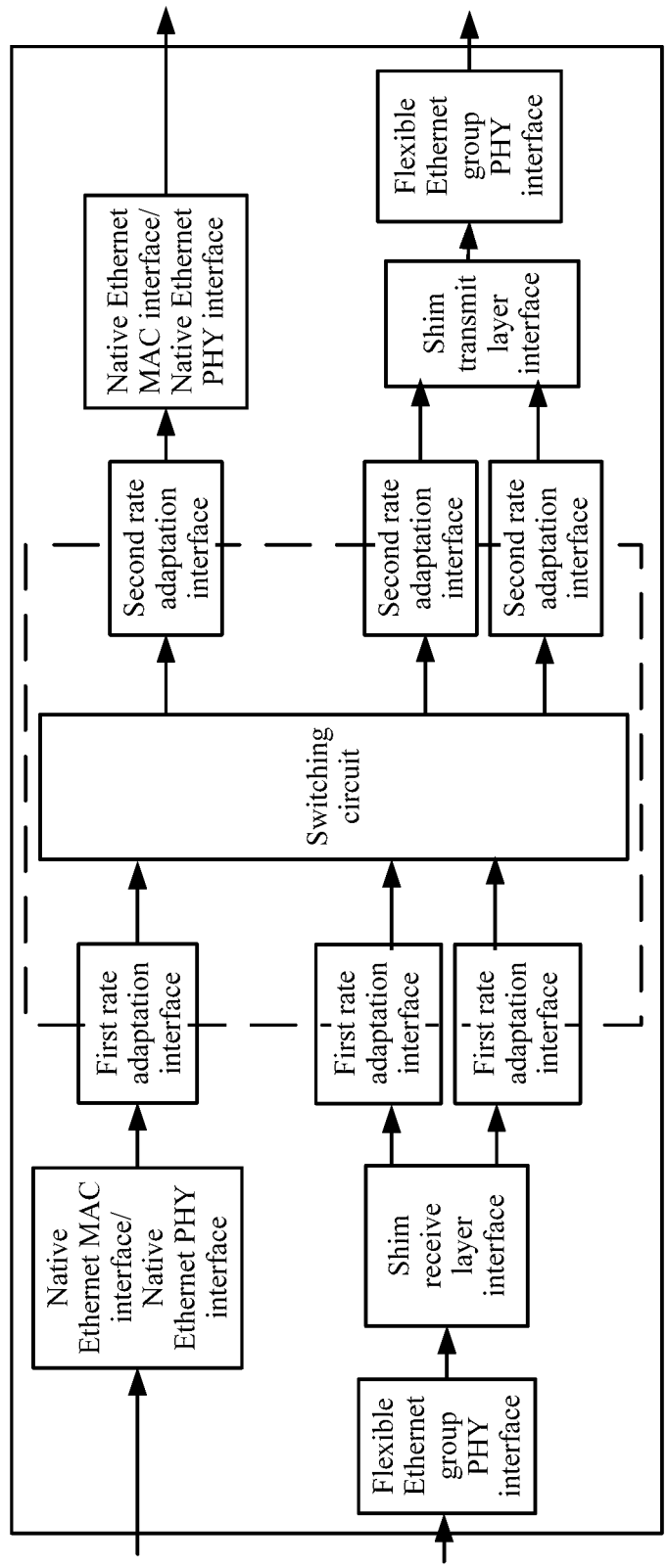
FIG. 1 is a diagram of an overall architecture for flexible-Ethernet data processing according to an embodiment of the present invention.

The flexible Ethernet may perform data switching based on the client service flow. For example, FIG. 1 is a diagram of an overall architecture for flexible-Ethernet data processing according to an embodiment of the present invention. The overall architecture shown in FIG. 1 includes a native Ethernet MAC interface or a native Ethernet PHY interface, a flexible Ethernet group PHY interface (that is, a FlexE group PHY interface), a shim receive layer interface (that is, a SHIM-RX interface), a first rate adaptation interface, a second rate adaptation interface, and a shim transmit layer interface (that is, a SHIM-TX interface).

It should be noted that the native Ethernet PHY interface may be specifically a physical coding (PCS) sublayer of the native Ethernet PHY interface and other parts except a physical encoding module in a physical medium access (PMA) sublayer of the native Ethernet PHY interface.

It should be further noted that the flexible Ethernet group PHY interface may be a PHY interface included in a FlexE group.

It should be further noted that the first rate adaptation interface and the second rate adaptation interface may be interfaces configured to perform rate adaptation to implement synchronization of clock domains. The first rate adaptation interface may be configured to complete first rate adaptation from a source clock domain to a switching circuit clock domain, and the source clock domain may represent a clock domain corresponding to an initial source of a client service flow. The second rate adaptation interface may be configured to complete second rate adaptation from the switching circuit clock domain to a destination clock domain, and the destination clock domain may represent a clock domain in which a transmission destination corresponding to a client service flow sent by a switching circuit is located.

It should be further noted that the first rate adaptation and the second rate adaptation may be specifically an idle adjust process (Idle Adjust Process, IAP).

It should be further noted that, in a transmit direction, the FlexE shim-TX layer interface may map a client service flow to a FlexE group for transmission; and in a receive direction, the FlexE shim-RX layer interface may demap the client service flow from the FlexE group.

The following describes a switching process in FIG. 1. Data is sent from the native Ethernet MAC interface or the native Ethernet PHY interface and may pass through the first rate adaptation interface. Rate adaptation from a client clock domain in which the native Ethernet MAC interface is located (or a client clock domain in which the native Ethernet PHY interface is located) to the switching circuit clock domain is completed in the first rate adaptation interface, to generate a client service flow that matches the switching circuit clock domain; and the client service flow is sent to the switching circuit.

Similarly, data is sent from the flexible Ethernet group PHY interface, and then a client service flow in a flexible Ethernet group is demapped in the shim receive layer interface, to obtain a plurality of client service flows (in FIG. 1, an example in which two client service flows are obtained is used). Each client service flow may be rate-adapted, in a corresponding first rate adaptation interface, from a shim receive clock domain to the switching circuit clock domain, to generate a client service flow that matches the switching circuit clock domain; and the client service flow is transmitted to the switching circuit.

The switching circuit receives the plurality of client service flows, directly implements crossing of signals between the client service flows, and sends each client service flow to a corresponding output interface. Before each client service flow is sent to the corresponding output interface, the sent client service flow may be further rate-adapted, in a corresponding second rate adaptation interface, from the switching circuit clock domain to the destination clock domain.

It should be noted that circuits encircled by a dotted box in FIG. 1 and the switching circuit may constitute a synchronization clock domain. In addition, it can be learned from FIG. 1 that an input signal and an output signal of the switching circuit are both client service flows.

It should be further noted that a bandwidth of a client service flow may be a fixed bandwidth or may fall in a dynamic range. If the bandwidth of the client service flow is fixed, the switching circuit may be designed directly based on the fixed bandwidth of the client service flow, and a transmission requirement of the switching circuit on the client service flow can be met.

However, if the bandwidth of the client service flow falls in a dynamic range and is configurable, when the switching circuit is designed, a case in which each client service flow is switched according to a maximum bandwidth needs to be considered for the switching circuit. Therefore, the switching circuit needs to be designed according to the maximum bandwidth supported by each client service flow. For example, for five client service flows from a same physical interface whose bandwidth capacity is 100 G, a bandwidth range of each client service flow is [5 G; 100 G]. Therefore, the switching circuit needs to be designed according to a bandwidth capacity of 5×100 G. In other words, the switching circuit may enable each input interface to have a maximum carrying capacity of 100 G, and a total capacity of the switching circuit needs to reach 500 G. However, in an actual use, when there are a plurality of client service flows at a same moment, because the bandwidth capacity of the physical interface is limited, actually each client service flow cannot reach the maximum bandwidth capacity. In other words, a total bandwidth capacity of the five client service flows may be only 100 G, but the switching circuit has configured a 100 G input interface for each client service flow. Therefore, a speedup factor (the switching capacity provided by the switching circuit/an actually used switching capacity of the switching circuit) of the switching circuit is rather large, and excessive circuit resources are also consumed, resulting in unnecessary waste of resources.

Figure 2A:
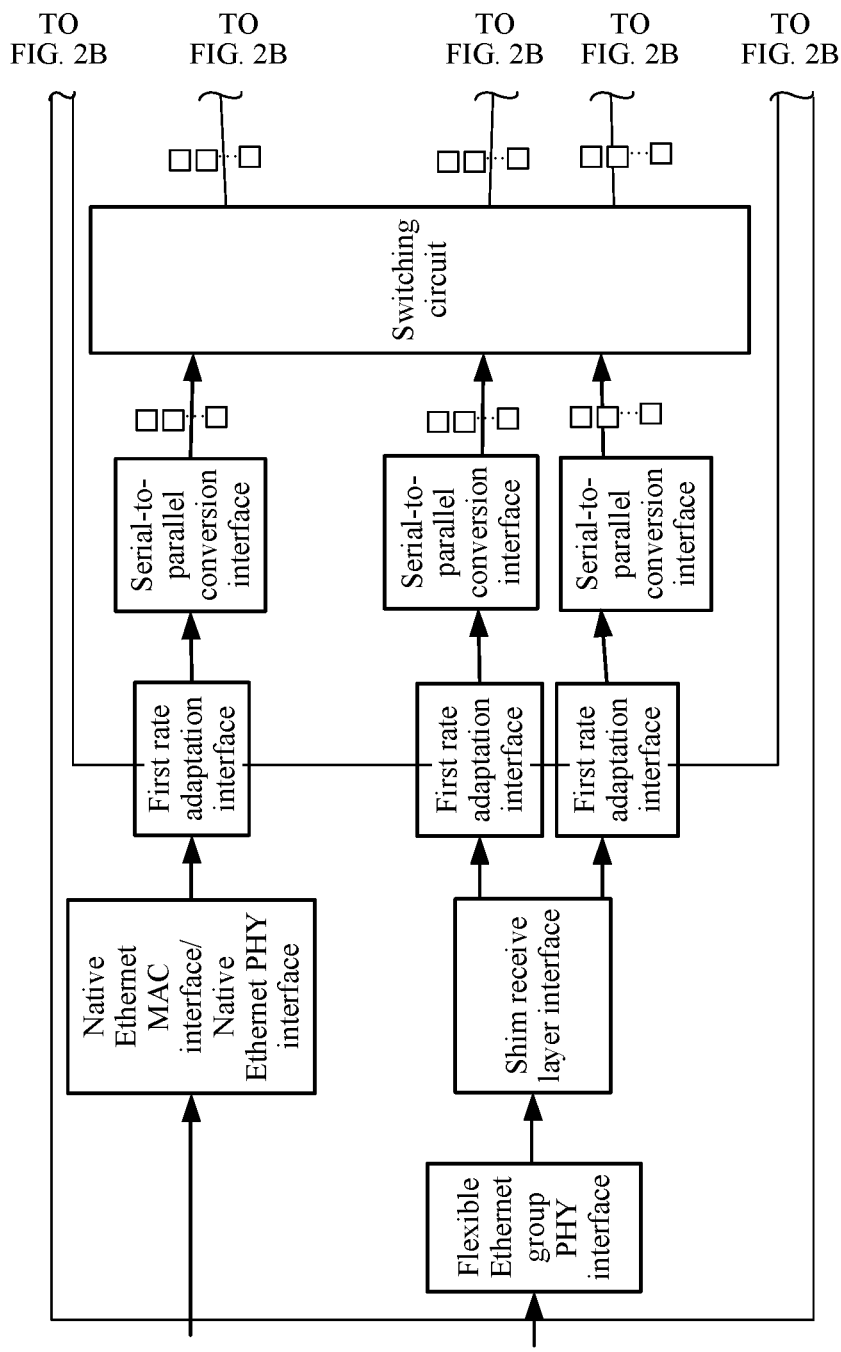
FIG. 2A and FIG. 2B are diagrams of another overall architecture for flexible-Ethernet data processing according to an embodiment of the present invention.
Figure 2B:
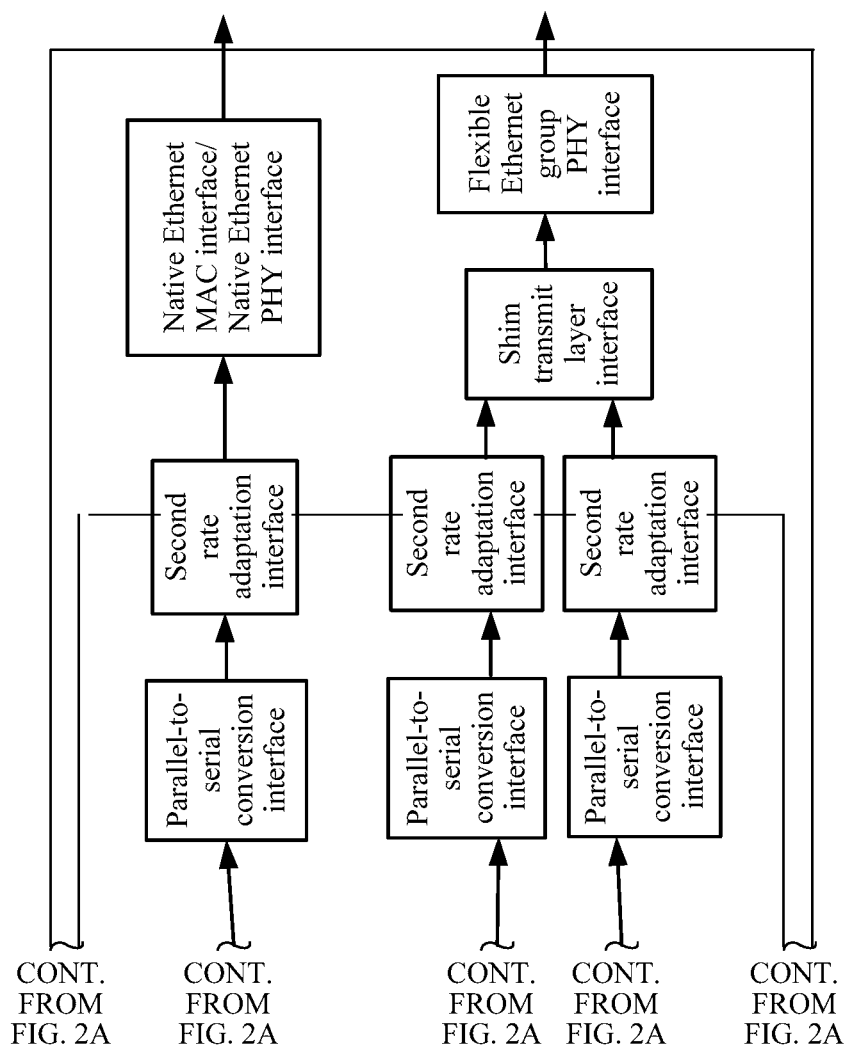

To solve the foregoing technical problem, the embodiments of the present invention provide a flexible-Ethernet data processing method and a related device. FIG. 2A and FIG. 2B are diagrams of another overall architecture for flexible-Ethernet data processing according to an embodiment of the present invention. The architecture shown in FIG. 2A and FIG. 2B includes a native Ethernet MAC interface/a native Ethernet PHY interface, a flexible Ethernet group PHY interface (that is, a FlexE group PHY interface), a shim receive layer interface (that is, a SHIM-RX interface), a first rate adaptation interface, a second rate adaptation interface, a shim transmit layer interface, a serial-to-parallel conversion interface, and a parallel-to-serial conversion interface.

It should be noted that the architecture may be provided in a switching device. For example, the switching device may be a mobile bearer device. Further, the mobile bearer device may be a core layer device (Provider, P) or an edge device (Provider Edge, PE).

The core layer device may be a network device in a network, and both sides of the core layer device may be network-to-network interfaces (Network-to-Network Interface, NNI). For example, the core layer device may be a switching device in flexible Ethernet networking.

The edge device of a core layer may be a network device connected to a user side at an edge of the network, and one side of the edge device is a user network interface (User Network Interface, UNI), one side is an NNI interface. For example, the edge device of the core layer may be an access device in the flexible Ethernet networking.

It should be noted that, in comparison with the overall architecture shown in FIG. 1, the serial-to-parallel conversion interface and the parallel-to-serial conversion interface are added to the overall architecture shown in FIG. 2A and FIG. 2B. For other parts that are the same as those in FIG. 1, refer to related descriptions of the related parts in FIG. 1. Details are not described herein again.

It should be noted that the serial-to-parallel conversion interface may be configured to convert a client service flow into a parallel client slot flow. The parallel-to-serial conversion interface may be configured to restore a parallel client slot flow to a client service flow.

The client slot flow includes a plurality of slots (slot), and a single slot may have a fixed bandwidth capacity, for example, 5 G.

The following describes a data switching process in FIG. 2A and FIG. 2B. Data is sent from the native Ethernet MAC interface or the native Ethernet PHY interface, and first rate adaptation from a client clock domain in which the native Ethernet MAC interface is located or a client clock domain in which the native Ethernet PHY interface is located to a switching circuit clock domain may be completed in the first rate adaptation interface, to generate a client service flow that matches the switching circuit clock domain.

Serial-to-parallel conversion may be performed, in the serial-to-parallel conversion interface, on the client service flow that matches the switching circuit clock domain, to generate a plurality of parallel client slot flows. For example, a client slot flow that includes two parallel 5 G slots may be generated for a 10 G client service flow, and a client slot flow that includes eight 5 G slots may be generated for a 40 G client service flow.

Similarly, data is sent from the flexible Ethernet group PHY interface, and then a client service flow in a flexible Ethernet group is demapped in the shim receive layer interface, to obtain a plurality of client service flows (in FIG. 1, an example in which two client service flows are obtained is used). Each client service flow may be rate-adapted, in a corresponding first rate adaptation interface, from a shim receive clock domain to the switching circuit clock domain, to generate a client service flow that matches the switching circuit clock domain; and serial-to-parallel conversion is performed, in the serial-to-parallel conversion interface, on the client service flows, to generate a plurality of parallel client slot flows.

A switching circuit receives the plurality of parallel client slot flows, implements crossing of signals between the client slot flows, and sends each client slot flow to a corresponding output interface.

Before each client slot flow is sent to the corresponding output interface, each sent client slot flow may be further restored, in a corresponding parallel-to-serial conversion interface, to a serial client service flow; and the restored client service flow may be rate-adapted, in a corresponding second rate adaptation interface, from the switching circuit clock domain to a destination clock domain.

It should be noted that circuits encircled by a dotted box in FIG. 2A and FIG. 2B and the switching circuit may constitute a synchronization clock domain, that is, the switching circuit clock domain. It can be learned from FIG. 2A and FIG. 2B that an input signal and an output signal of the switching circuit are both client slot flows.

In an embodiment, the switching circuit may carry the client slot flow by using a slot as an object, each slot may correspond to one input interface, and a carrying capacity of each input interface may be set to a capacity of the slot, for example, 5 G. A total quantity of input interfaces in the switching circuit may be a fixed value, and a total carrying capacity may also be a fixed value, but a carried slot corresponding to an input interface may be dynamically configured.

For example, there are three to-be-switched client slot flows: A client slot flow A includes a 5 G slot A-1; a client slot flow B includes two 5 G slots: a slot B-1 and a slot B-2; and a client slot flow C includes three 5 G slots: a slot C-1, a slot C-2, and a slot C-3. In this case, the switching circuit may dynamically configure an input interface 1 to carry the slot A-1, an input interface 2 to carry the slot B-1, an input interface 3 to carry the slot B-2, an input interface 4 to carry the slot C-1, an input interface 5 to carry the slot C-2, and an input interface 6 to carry the slot C-3; or the switching circuit may dynamically configure an input interface 6 to carry the slot A-1, an input interface 5 to carry the slot B-1, an input interface 4 to carry the slot B-2, an input interface 3 to carry the slot C-1, an input interface 2 to carry the slot C-2, and an input interface 1 to carry the slot C-3. This is not limited in the present invention. Further, a correspondence between a slot and an input interface may be stored, so that the slot is correspondingly restored to a client slot flow (still further, the client slot flow is correspondingly restored to a client service flow). This is convenient for the interface to subsequently carry the client service flow.

It can be learned that, by using the overall architecture shown in FIG. 2A and FIG. 2B, using a client slot flow as a switching process object is implemented (further, using a slot as a switching process object is implemented). Therefore, when the switching circuit is designed, because a single slot of the client slot flow has a fixed bandwidth capacity, the total carrying capacity of the switching circuit may be set based on the fixed bandwidth capacity of the single slot. For example, for two client service flows from a same physical interface whose bandwidth capacity is 100 G, a bandwidth range of each client service flow is [5 G, 100 G]. Because the bandwidth capacity of the physical interface is limited, actually each client service flow cannot reach a maximum bandwidth capacity at a same moment. For example, an actual bandwidth capacity of each client service flow is 50 G at this time. After serial-to-parallel conversion, each client service flow is converted to obtain 10 5 G slots, and there are 20 slots in total. The switching circuit may configure an input interface to correspondingly carry one slot. At this time, a total bandwidth used is 100 G. Therefore, a total capacity of the switching circuit may be designed based on the bandwidth capacity of the physical interface (for example, the capacity 100 G of the physical interface in this example). Compared with a design based on a maximum bandwidth supported by each client service flow (for example, a design based on 1000 G in this example), this can achieve a more proper speedup factor, thereby avoiding waste of circuit resources.

To describe this application more clearly, the following describes a method embodiment of this application.

Figure 3:
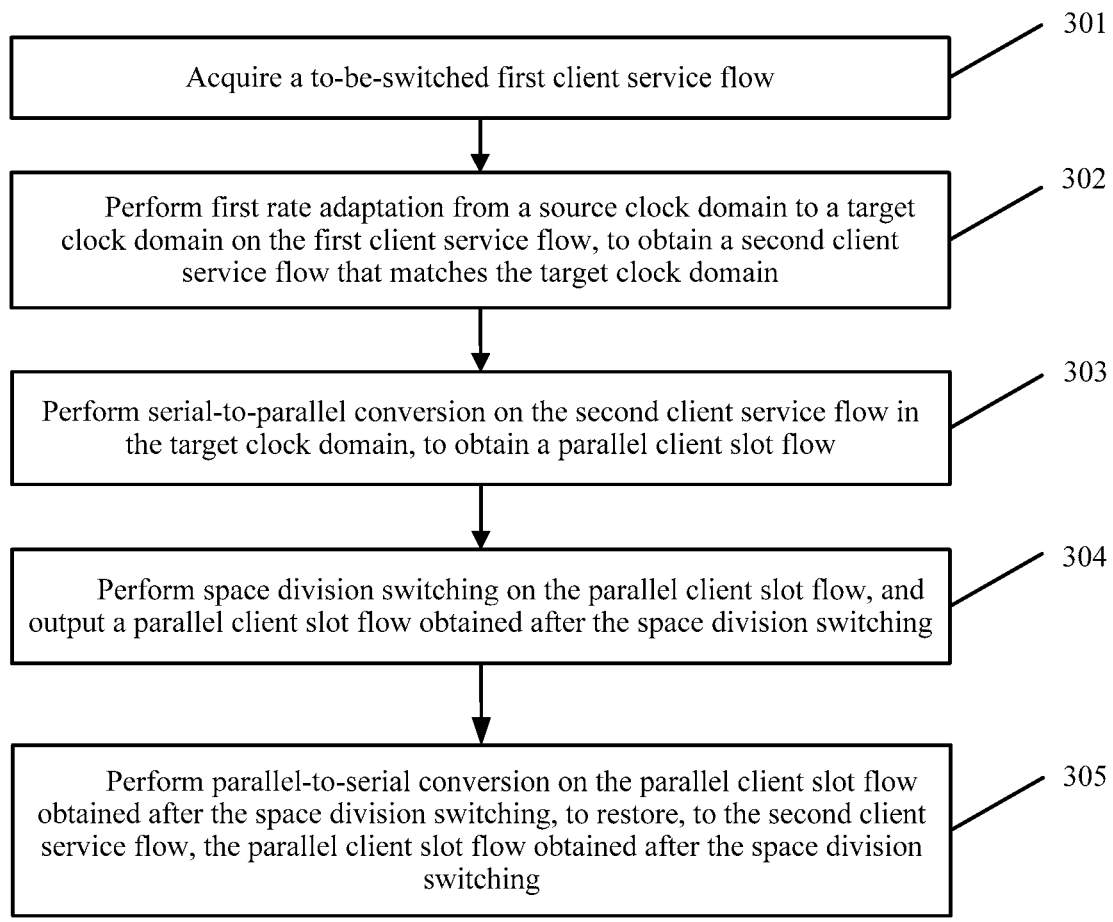
FIG. 3 is a schematic flowchart of a flexible-Ethernet data processing method according to an embodiment of the present invention.

FIG. 3 is a schematic flowchart of a flexible-Ethernet data processing method provided in this application. As shown in FIG. 3, this embodiment of this application includes the following steps.

301. Acquire a to-be-switched first client service flow.

It should be noted that the first client service flow is a service flow suitable for transmission on a flexible Ethernet. The service flow suitable for transmission on the flexible Ethernet may be a service flow that meets a flexible Ethernet transmission standard. For example, in the flexible Ethernet transmission standard, a 64B/66B encoded bit stream is a client flow. Then the first client service flow is a 64B/66B encoded bit stream. Alternatively, it is defined in the flexible Ethernet transmission standard that a 128B encoded bit stream is a client flow. Then the first client service flow may be alternatively a 128B encoded bit stream. This is not limited in this embodiment of the present invention.

In some feasible implementations, the first client service flow may originate from a native Ethernet MAC interface, a native Ethernet PHY interface, or a shim receive layer interface. This is not limited in this embodiment of the present invention.

302. Perform first rate adaptation from a source clock domain to a target clock domain on the first client service flow, to obtain a second client service flow that matches the target clock domain.

It should be noted that the source clock domain may represent a clock domain corresponding to an initial source of the first client service flow. For example, if the initial source of the first client service flow is the native Ethernet MAC interface, the source clock domain may be a clock domain corresponding to the native Ethernet MAC interface; or if the initial source of the first client service flow is the shim receive layer interface, the source clock domain may be a clock domain corresponding to the shim receive layer interface.

It should be further noted that the target clock domain includes a switching circuit clock domain. For example, the circuits encircled by the dotted box in FIG. 2A and FIG. 2B and a switching circuit may constitute a synchronization clock domain, and the synchronization clock domain is the switching circuit clock domain.

It should be further noted that the first rate adaptation from the source clock domain to the target clock domain on the first client service flow may be specifically: performing rate adaptation on the first client service flow across clock domains (from the source clock domain to the target clock domain), so that a rate of the first client service flow matches a rate of the switching circuit.

In some feasible implementations, the first rate adaptation may be IAP processing, and the IAP processing may be performed in an IAP interface.

For example, IAP processing is performed, in the IAP interface, on the first client service flow across the clock domains, to obtain a second client service flow that matches the switching circuit clock domain.

It should be further noted that the second client service flow and the switching circuit clock domain are located in a same clock domain, and the first client service flow and the source clock domain are located in a same clock domain.

303. Perform serial-to-parallel conversion on the second client service flow in the target clock domain, to obtain a parallel client slot flow.

It should be noted that the second client service flow may be a serial service flow. The serial-to-parallel conversion may be a processing process in which the serial client service flow is converted into a parallel client slot flow.

It should be further noted that the client slot flow may include a plurality of slots (slot), and all the slots may have a same bandwidth capacity. For example, each slot may have a bandwidth capacity of 5 G. Certainly, the foregoing bandwidth capacity is merely an example and is not exhaustive, and the bandwidth capacity includes but is not limited to the foregoing optional bandwidth capacity.

It should be further noted that a bandwidth capacity of the second client service flow may be equal to a bandwidth capacity of the client slot flow, and the bandwidth capacity of the client slot flow is a sum of bandwidth capacities of the slots.

For example, the bandwidth capacity of the second client service flow is 10 G After serial-to-parallel conversion, two parallel 5 G slots may be generated, the two parallel 5 G slots constitute a client slot flow, and a total bandwidth capacity of the client slot flow is 10 G.

It should be further noted that a bandwidth capacity of the second client service flow may alternatively be different from a bandwidth capacity of the client slot flow. For example, a specified capacity of a single slot is 5 G, and the bandwidth capacity of the second client service flow is 8 G. After serial-to-parallel conversion, two parallel 5 G slots may be generated, the two parallel 5 G, slots constitute a client slot flow, and a total bandwidth capacity of the client slot flow is 10 G; where a 2 G portion that exceeds the bandwidth capacity of the second client service flow may be a portion obtained through byte stuffing.

In some feasible implementations, a serial-to-parallel conversion interface may be configured for a core layer device (or an edge device), and the serial-to-parallel conversion on the second client service flow is completed in the serial-to-parallel conversion interface. Certainly, the core layer device (or the edge device) may alternatively complete, in another interface, the serial-to-parallel conversion on the second client service flow. This is not limited in this embodiment of the present invention.

304. Perform space division switching on the parallel client slot flow, and output a parallel client slot flow obtained after the space division switching.

It should be noted that the switching circuit may perform the space division switching on the parallel client slot flow.

It should be further noted that the switching circuit may configure a plurality of input interfaces and a plurality of output interfaces. The input interfaces each may be configured to receive a single slot of the parallel client slot flow, and the output interfaces each may be configured to send a single slot of the parallel client slot flow obtained after the switching.

In some feasible implementations, if there are a plurality of client slot flows, each input interface may receive one slot of one of the client slot flows and transmit the slot to the switching circuit for space division switching; and after the switching circuit completes the space division switching, a slot of a client slot flow obtained after the space division switching may be output through a corresponding output interface.

In other words, each input interface may receive a slot, and the input interfaces are independent from each other and do not affect each other; and each output interface may output a corresponding slot, and the output interfaces are independent from each other and do not affect each other. If the plurality of client slot flows are input into the switching circuit at the same time, the plurality of output interfaces may output the client slot flows at the same time. For example, N client slot flows are input into corresponding output interfaces at the same time. After the switching circuit performs space division switching on the N client slot flows, N processed client slot flows may be output from corresponding output interfaces at the same time.

In an embodiment, performing space division switching on the parallel client slot flow includes: performing the space division switching on the parallel client slot flow based on a preset crossing configuration table.

It should be noted that the preset crossing configuration table may include a correspondence between an input interface and an output interface of the parallel client slot flow.

For example, in the crossing configuration table, the following correspondences may exist: An input interface 1 corresponds to an output interface 2, an input interface 2 corresponds to an output interface 3, an input interface 3 corresponds to an output interface 1, and the like. Certainly, the foregoing correspondences are merely examples and are not exhaustive, and the correspondence includes but is not limited to the foregoing optional correspondences.

In some feasible implementations, the switching circuit may determine, based on the crossing configuration table, an output interface corresponding to each input client slot flow; and outputs, through the determined output interface, a parallel service flow obtained after the space division switching. For example, a slot A is input into the switching circuit through the input interface 1, and it can be determined based on the crossing configuration table that the input interface 1 corresponds to the output interface 2. Therefore, the switching circuit may output the slot A from the output interface 2 and restore the slot to a client slot flow based on a correspondence between the slot and the interface.

In some feasible implementations, each parallel client slot flow may correspond to a plurality of input interfaces, and the switching circuit may determine, based on a quantity of parallel slots, a quantity of input interfaces to be used. For example, there are three slots. Then the switching circuit may use three input interfaces (and correspondingly use three output interfaces) to perform space division switching on the three slots. This can reduce power consumption of the switching circuit.

It should be further noted that the switching circuit may implement a crossing matrix for client slot flows. For example, the switching circuit may implement a crossing matrix for N*N client slot flows: When m slots are input, m slots are output as well; or when N client slot flows are input, N restored client slot flows are output as well. An output interface corresponding to each output slot may be determined based on the crossing configuration table.

In some feasible implementations, when there are a plurality of client service flows, a quantity of client slot flows obtained after serial-to-parallel conversion may be the same as a quantity of the client service flows, but quantities of slots in the client slot flows may be different.

For example, there are three client service flows: A bandwidth capacity of a client service flow A is 10 G, and a client slot flow including two 5 G slots is obtained; a bandwidth capacity of a client service flow B is 11 G, and a client slot flow including three 5 G slots is obtained; and a bandwidth capacity of a client service flow C is 8 G, and a client slot flow including three 5 G slots is obtained. Therefore, there may be three client slot flows in total, but quantities of slots in the client slot flows may be different. In a space division switching process, a single slot in a client slot flow may be switched, and an input interface and an output interface corresponding to each slot in the client slot flow are configured. This is not limited in this embodiment of the present invention.

305. Perform parallel-to-serial conversion on the parallel client slot flow obtained after the space division switching, to restore, to the second client service flow, the parallel client slot flow obtained after the space division switching.

It should be noted that the parallel-to-serial conversion may be a processing process in which the parallel client slot flow is converted into a serial client service flow.

In some feasible implementations, a parallel-to-serial conversion interface may be configured for a core layer device (or an edge device), and the parallel-to-serial conversion on the client slot flow is completed in the parallel-to-serial conversion interface. Certainly, the core layer device (or the edge device) may alternatively complete, in another interface, the parallel-to-serial conversion on the client slot flow. This is not limited in this embodiment of the present invention.

For example, after the parallel client slot flow obtained after the space division switching is output, the parallel-to-serial conversion on the parallel client slot flow obtained after the space division switching may be performed in the parallel-to-serial conversion interface, to obtain the second client service flow.

The restored second client service flow is a client service flow obtained based on the parallel client slot flow obtained after the space division switching.

It should be further noted that the parallel client slot flow is restored to the second client service flow, so that transmission in other interfaces may be performed in a form of a client service flow in a subsequent transmission process. This can ensure that the transmission in the other interfaces is not affected.

By implementing this embodiment of the present invention, when a total capacity of the switching circuit is designed, because the client slot flow includes a slot and each slot has a fixed capacity, the total capacity of the switching circuit may be designed based on the fixed bandwidth capacity of the slot, so that a difference between a switching capacity provided by the switching circuit and an actually used switching capacity of the switching circuit is reduced, thereby achieving a proper speedup factor of the switching circuit. This effectively resolves a problem of excessive resource consumption caused by an improper speedup factor during switching directly based on the client service flow. Moreover, the output client slot flow is restored to the client service flow. This ensures that the transmission in the other interfaces is not affected, facilitating large-scale networking based on the flexible Ethernet.

Figure 4:
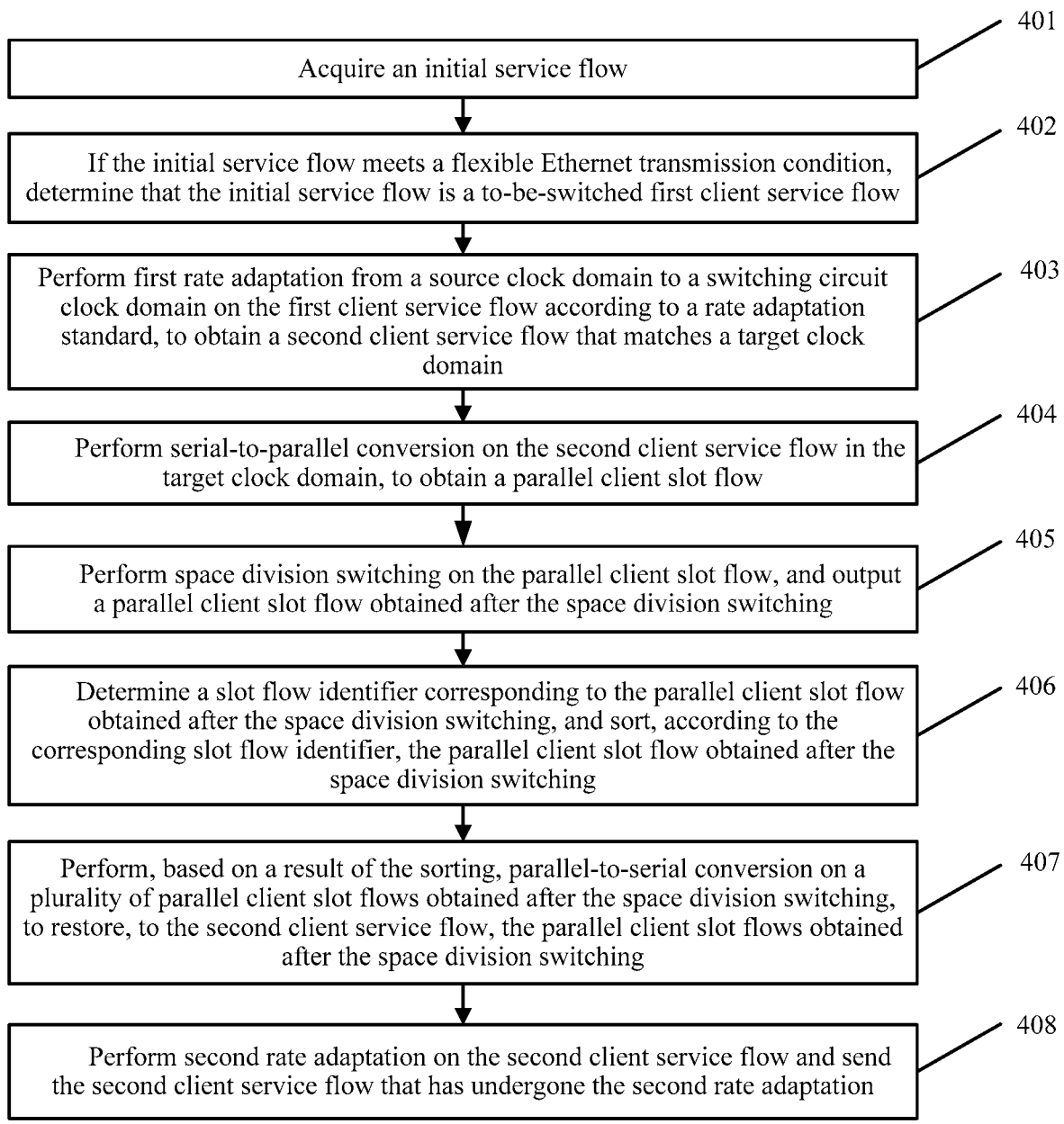
FIG. 4 is a schematic flowchart of another flexible-Ethernet data processing method according to an embodiment of the present invention.

FIG. 4 is a schematic flowchart of another flexible-Ethernet data processing method according to an embodiment of the present invention. As shown in FIG. 4, this embodiment of this application includes the following steps.

401. Acquire an initial service flow.

It should be noted that the initial service flow may be a service flow in compliance with a native Ethernet transmission standard or may be a service flow in compliance with a flexible Ethernet transmission standard.

402. If the initial service flow meets a flexible Ethernet transmission condition, determine that the initial service flow is a to-be-switched first client service flow.

A source of the initial service flow is used to determine whether the initial service flow meets the flexible Ethernet transmission condition.

It should be noted that the initial service flow may originate from a native Ethernet MAC interface, a native Ethernet PHY interface, or a shim receive layer interface.

If the source of the initial service flow is the shim receive layer interface, it can be determined that the initial service flow meets the flexible Ethernet transmission condition and the initial service flow is a service flow in compliance with the flexible Ethernet transmission standard. In other words, it can be determined that the initial service flow is the to-be-switched first client service flow.

In an embodiment, if the initial service flow does not meet the flexible Ethernet transmission condition, first code conversion is performed on the initial service flow according to a flexible Ethernet standard, to obtain the to-be-switched first client service flow.

It should be noted that, if the source of the initial service flow is the native Ethernet MAC interface or the native Ethernet PHY interface, it can be determined that the initial service flow does not meet the flexible Ethernet transmission condition.

It should be further noted that the flexible Ethernet transmission standard may be, for example, a flexible Ethernet transmission standard defined by the Optical Internetworking Forum (Optical Internetworking Forum, OIF).

It should be further noted that the first code processing may be, for example, processing in which the initial service flow is converted into the first client service flow through 64B/66B code conversion.

For example, if the initial service flow participating in switching originates from the native Ethernet MAC interface or the native Ethernet PHY interface, the initial service flow from the native Ethernet MAC interface or the native Ethernet PHY interface may be converted into the first client service flow through 64B/66 code conversion according to the OIF flexible Ethernet transmission standard; or if the initial service flow participating in switching originates from the shim receive layer interface, it is determined that the initial service flow is the first client service flow.

In some feasible implementations, the shim receive layer interface may perform demapping in a flexible Ethernet PHY interface, to obtain one or more first client service flows.

403. Perform first rate adaptation from a source clock domain to a switching circuit clock domain on the first client service flow according to a rate adaptation standard, to obtain a second client service flow that matches a target clock domain.

The rate adaptation standard may include an IEEE 802.3 standard.

In some feasible implementations, the rate adaptation standard may alternatively be the flexible Ethernet standard. This is not limited in this embodiment of the present invention.

The target clock domain includes the switching circuit clock domain.

The first rate adaptation may be IAP processing.

For example, IAP processing may be performed on the first client service flow according to the IEEE 802.3 standard, to rate-adapt the first client service flow from the source clock domain to the switching circuit clock domain.

404. Perform serial-to-parallel conversion on the second client service flow in the target clock domain, to obtain a parallel client slot flow.

405. Perform space division switching on the parallel client slot flow, and output a parallel client slot flow obtained after the space division switching.

In some feasible implementations, a switching circuit may perform space division switching on the parallel client slot flow, and specifically, may perform space division switching on a slot included in the client slot flow.

It should be noted that, for specific implementation processes of steps 404 and 405 shown in this embodiment of the present invention, reference may be made to related descriptions of steps 303 and 304 in the foregoing method embodiment. Details are not described herein again.

406. Determine a slot flow identifier corresponding to the parallel client slot flow obtained after the space division switching, and sort, according to the corresponding slot flow identifier, the parallel client slot flow obtained after the space division switching.

It should be noted that the slot flow identifier may be an identifier that is set for the slot in the client slot flow, and the slot flow identifier may be used to uniquely identify the slot in the client slot flow. For example, the slot flow identifier may be a number, a letter, a special character, or the like. This is not limited in this embodiment of the present invention.

In some feasible implementations, the slot flow identifier is a combination of a number and a letter, and each slot in the client slot flow corresponds to one slot flow identifier.

For example, before outputting the client slot flow through an output interface, the switching circuit may recombine the slot into the client slot flow based on the slot flow identifier. For example, a client slot flow A includes two 5 G slots, a slot flow identifier of one of the slots is A-1, and a slot flow identifier of the other slot is A-2. The switching circuit may perform sort according to a sequence of A-1 to A-2, and recombine the slots corresponding to the slot flow identifiers into the client slot flow A.

407. Perform, based on a result of the sorting, parallel-to-serial conversion on a plurality of parallel client slot flows obtained after the space division switching, to restore, to the second client service flow, the parallel client slot flows obtained after the space division switching.

It should be noted that the result of the sorting may be a plurality of parallel client slot flows that are obtained after the space division switching and that are recombined according to the sorting.

408. Perform second rate adaptation on the second client service flow and send the second client service flow that has undergone the second rate adaptation.

It should be noted that the second rate adaptation may be adaptation from the switching circuit clock domain to a destination clock domain, and the destination clock domain may represent a clock domain in which a transmission destination corresponding to a client service flow sent by the switching circuit is located.

In some feasible implementations, the second rate adaptation may be IAP processing, and the IAP processing may be performed in an IAP interface. The IAP processing may be based on the IEEE 802.3 standard.

It should be noted that, if an initial source of the second service flow is the shim receive layer interface, the second rate adaptation may be performed on the second client service flow and the second client service flow that has undergone the second rate adaptation is sent.

It should be further noted that, in a core layer device, for a slot obtained after the space division switching, parallel-to-serial conversion may be performed, based on the slot flow identifier, on slots belonging to the same client slot flow, to restore the second client service flow; then the second client service flow undergoes IAP processing and is sent to a corresponding shim transmit layer interface for transmission; and time division switching of each slot is completed in the shim transmit layer interface.

It should be further noted that, in an edge device, for a slot obtained after the space division switching, parallel-to-serial conversion may be performed, based on the slot flow identifier, on slots belonging to the same client slot flow, to restore the second client service flow; and then IAP processing is performed on the second client service flow, to restore a service flow in a clock domain in which the native Ethernet MAC interface or the native Ethernet PHY interface is located.

Figure 5:
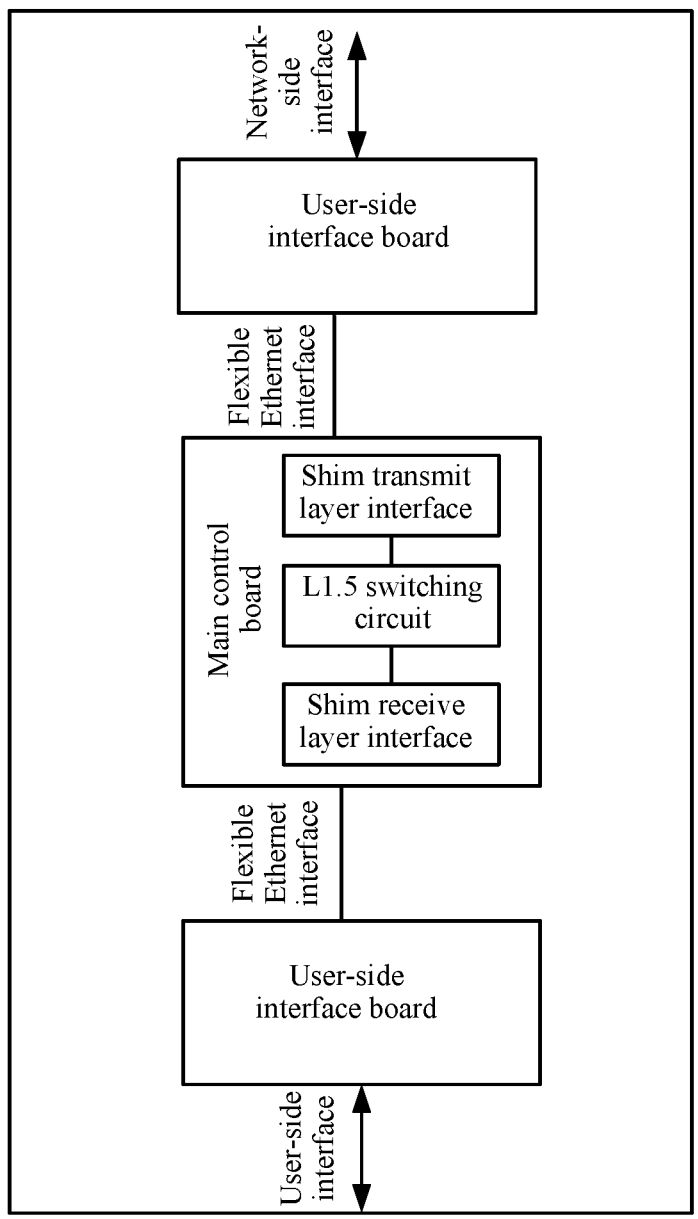
FIG. 5 is a schematic diagram of a flexible-Ethernet data processing scenario according to an embodiment of the present invention.

For example, box-type flexible-Ethernet data switching may be implemented in a manner of packet forwarding in an embodiment of the present invention. FIG. 5 is a schematic diagram of a flexible-Ethernet data processing scenario according to an embodiment of the present invention.

In FIG. 5, a user-side interface board may receive a first client service flow through a user-side interface. After undergoing first rate adaptation, the first client service flow may be directly connected to a flexible Ethernet interface that is connected to a main control board. The main control board may acquire the first client service flow from the flexible Ethernet interface; first perform first rate adaptation (which, for example, is IAP processing) on the received first client service flow, to adapt to an L1.5 switching circuit clock domain; and perform serial-to-parallel conversion on a serial first client service flow based on a configured client service flow rate, to obtain a parallel client slot flow.

An L1.5 switching circuit in the main control board may complete client slot flow-based space division switching according to a related configuration of a switched network. Further, the switched network may output client slot flows that belong to the same client service flow, and perform parallel-to-serial conversion on the client slot flows in the switching circuit clock domain, to obtain a single serial second client service flow.

Further, the second client service flow in the switching circuit clock domain is converted to a shim transmit interface clock domain through second rate adaptation (which, for example, is IAP processing). A flexible Ethernet interface that is located on the main control board and that is connected to a network-side interface board may send the second client service flow, and the network-side interface board may rate-adapt the second client service flow sent by the main control board and then send a rate-adapted second client service flow to the network-side interface for transmission.

It can be learned that, in this embodiment of the present invention, it is ensured that an input signal and an output signal of the switching circuit are client slot flows, and a difference between a total circuit capacity designed based on the client slot flows and an actually used circuit capacity is relatively small. Therefore, a proper speedup factor is achieved for the circuit, avoiding waste of circuit resources. In addition, the rate adaptation may be based on an IEEE 8023.3 standard. This facilitates interworking between devices of different vendors, thereby implementing large-scale networking based on a flexible Ethernet.

The foregoing describes in detail the method according to the embodiments of the present invention. To facilitate better implementation of the foregoing solutions of the embodiments of the present invention, correspondingly, the following describes corresponding apparatus embodiments.

Figure 6:
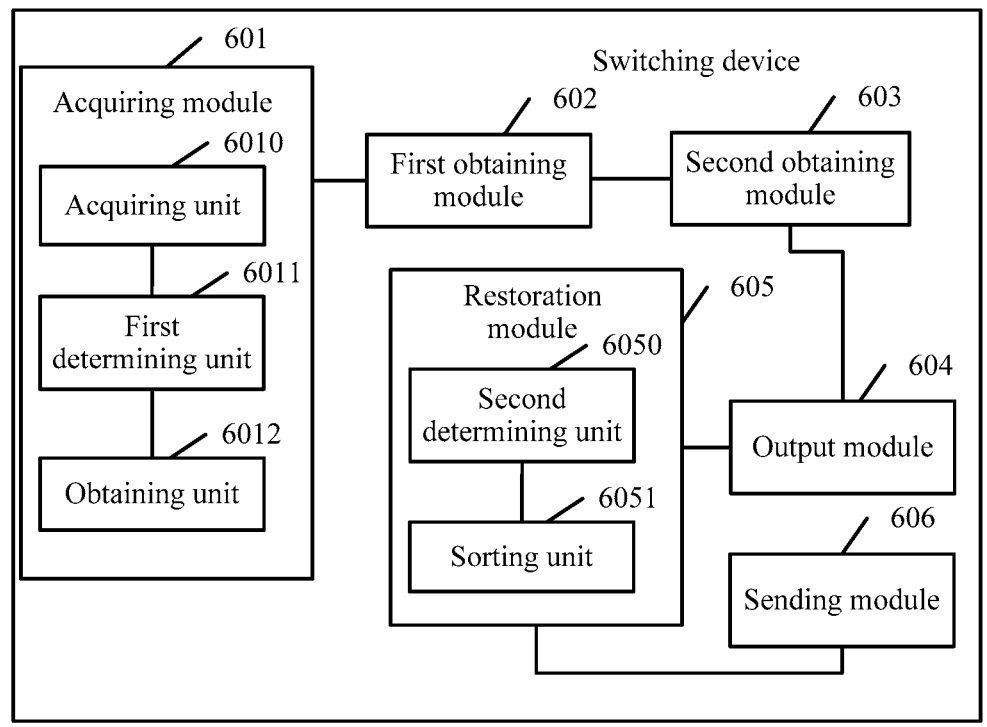
FIG. 6 is a schematic structural diagram of a switching device according to an embodiment of the present invention.

FIG. 6 is a schematic structural diagram of a switching device according to an embodiment of the present invention. The switching device shown in FIG. 6 may include an acquiring module 601, a first obtaining module 602, and a second obtaining module 603.

The acquiring module 601 is configured to acquire a to-be-switched first client service flow.

The first client service flow is a service flow suitable for transmission on a flexible Ethernet.

The first obtaining module 602 is configured to perform first rate adaptation from a source clock domain to a target clock domain on the first client service flow, to obtain a second client service flow that matches the target clock domain.

The target clock domain includes a switching circuit clock domain.

The second obtaining module 603 is configured to perform serial-to-parallel conversion on the second client service flow in the target clock domain, to obtain a parallel client slot flow.

In an embodiment, the switching device further includes: an output module 604, configured to perform space division switching on the parallel client slot flow, and output a parallel client slot flow obtained after the space division switching; and a restoration module 605, configured to perform parallel-to-serial conversion on the parallel client slot flow obtained after the space division switching, to restore, to the second client service flow, the parallel client slot flow obtained after the space division switching.

In an embodiment, the acquiring module 601 includes: an acquiring unit 6010, configured to acquire an initial service flow; and a first determining unit 6011, configured to: if the initial service flow meets a flexible Ethernet transmission condition, determine that the initial service flow is the to-be-switched first client service flow, where a source of the initial service flow is used to determine whether the initial service flow meets the flexible Ethernet transmission condition.

In an embodiment, the acquiring module 601 further includes an obtaining unit 6012, configured to: if the initial service flow does not meet the flexible Ethernet transmission condition, perform first code conversion on the initial service flow according to a flexible Ethernet standard, to obtain the to-be-switched first client service flow.

In an embodiment, the first obtaining module 602 is specifically configured to perform the first rate adaptation from the source clock domain to the switching circuit clock domain on the first client service flow according to a rate adaptation standard, to obtain the second client service flow that matches the target clock domain.

The rate adaptation standard includes an IEEE 802.3 standard.

In an embodiment, the switching device further includes a sending module 606, configured to perform second rate adaptation on the second client service flow and send the second client service flow that has undergone the second rate adaptation.

In an embodiment, the output module 604 is specifically configured to perform the space division switching on the parallel client slot flow based on a preset crossing configuration table, where the preset crossing configuration table includes a correspondence between an input interface and an output interface of the parallel client slot flow.

In an embodiment, the parallel client slot flow corresponds to a slot flow identifier, and the restoration module 605 includes: a second determining unit 6050, configured to determine the time flow identifier corresponding to the parallel client slot flow obtained after the space division switching; and a sorting unit 6051, configured to sort, according to the corresponding slot flow identifier, the parallel client slot flow obtained after the space division switching; and perform, based on a result of the sorting, parallel-to-serial conversion on a plurality of parallel client slot flows obtained after the space division switching.

Figure 7:
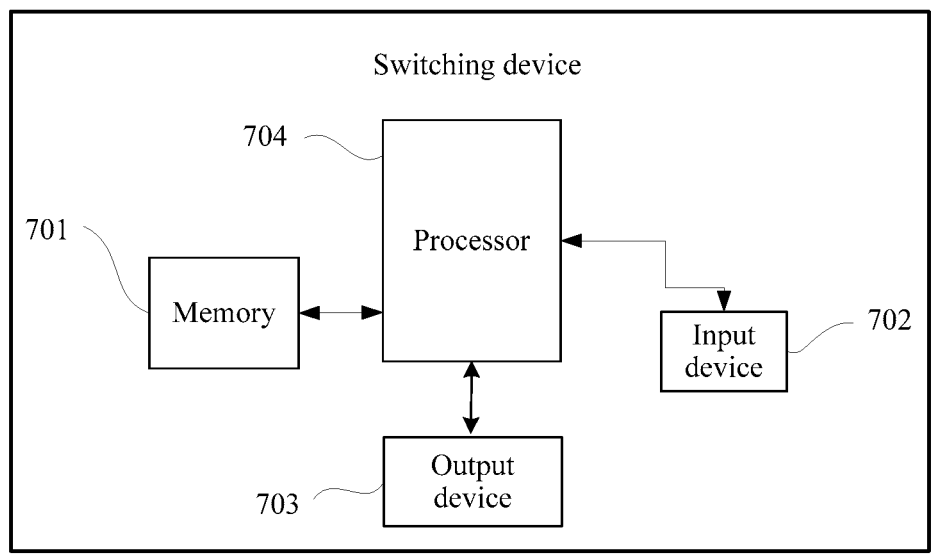
FIG. 7 is a schematic structural diagram of another switching device according to an embodiment of the present invention.

FIG. 7 is a schematic structural diagram of another switching device according to an embodiment of the present invention. The switching device described in this embodiment includes components such as a memory 701, an input device 702, an output device 703, and a processor 704. A person skilled in the art may understand that a structure of the switching device shown in FIG. 7 constitutes no limitation on the switching device, and the switching device may include more or fewer parts than those shown in the figure, or combine some parts, or split some parts, or have different component arrangements.

The following describes the components of the switching device in detail with reference to FIG. 7.

The processor 704 executes various function applications of the switching device and processes data by running a software program and a module stored in the memory 701. The memory 701 may be configured to store the software program and the module, and mainly includes a program storage area and a data storage area. The program storage area may store an operating system, an application program required by at least one function, and the like; and the data storage area may store data created according to use of a terminal, and the like.

The input device 702 may be configured to receive a signal input, for example, receive a signal input of a client service flow and receive a signal input of a client slot flow. In some feasible implementations, the input device 702 may be combined with an input interface of a switching circuit or a shim receive layer interface.

The output device 703 may be configured to control a signal output, for example, a signal output of the client service flow and a signal output of the client slot flow. In some feasible implementations, the output device 703 may be combined with an output interface of the switching circuit or a shim transmit layer interface.

The processor 704 is a control center of the switching device and is connected to all parts of the entire device by using various interfaces and lines. The processor 704 executes various functions of the switching device and processes data by running or executing the software program and/or the module stored in the memory 701 and by invoking data stored in the memory 701, to perform overall monitoring on the switching device. Optionally, the processor 704 may include one or more processing units.

In some feasible implementations, the input device 702 and the output device 703 may be combined in the switching circuit to receive a signal and switch the signal. The switching circuit may be an L1.5 switching circuit.

The switching device may further include a power supply (such as a battery) that supplies power to each component. Preferably, the power supply may be logically connected to the processor 704 by using a power supply management system, to implement functions such as charging management, discharging management, and power consumption management by using the power supply management system.

Specifically, the processor 704 may invoke a program instruction stored in the memory 701, to implement the method described in the embodiments of the present invention.

Specifically, the processor 704 invokes the program instruction stored in the memory 701 to perform the following steps:

acquiring a to-be-switched first client service flow, where the first client service flow is a service flow suitable for transmission on a flexible Ethernet;

performing first rate adaptation from a source clock domain to a target clock domain on the first client service flow, to obtain a second client service flow that matches the target clock domain, where the target clock domain includes a switching circuit clock domain; and performing serial-to-parallel conversion on the second client service flow in the target clock domain, to obtain a parallel client slot flow.

The method performed by the processor in this embodiment of the present invention is described from a perspective of the processor. It can be understood that in this embodiment of the present invention, the processor needs to cooperate with other hardware structures to perform the foregoing method. For example, the acquiring a to-be-switched first client service flow may be implemented by the processor 704 controlling the input device 702, and the performing first rate adaptation from a source clock domain to a target clock domain on the first client service flow and the performing serial-to-parallel conversion on the second client service flow in the target clock domain may be implemented by the process 704 invoking the program stored in the memory 701. A specific implementation process is not described in detail and is not limited in this embodiment of the present invention.

Optionally, the switching device may implement a corresponding step in the foregoing method embodiment by using the processor and another device. It should be understood that this embodiment of the present invention is an entity apparatus embodiment corresponding to the method embodiments, and descriptions of the method embodiments are also applicable to this embodiment of the present invention.

In another embodiment of the present invention, a switching device readable storage medium is provided. The switching device readable storage medium stores a program. When the program is executed by a processor, the following steps may be implemented: acquiring a to-be-switched first client service flow, where the first client service flow is a service flow suitable for transmission on a flexible Ethernet; performing first rate adaptation from a source clock domain to a target clock domain on the first client service flow, to obtain a second client service flow that matches the target clock domain, where the target clock domain includes a switching circuit clock domain; and performing serial-to-parallel conversion on the second client service flow in the target clock domain, to obtain a parallel client slot flow.

It should be noted that, for a specific process in which the computer readable storage medium is executed by the processor, reference may be made to the method described in the foregoing method embodiments. Details are not described herein again.

Still another embodiment of the present invention further provides a computer program product including an instruction. When the computer program product runs on a computer, the computer is enabled to perform the method according to the foregoing method embodiments.

The switching device readable storage medium may be an internal storage unit of the switching device according to any one of the foregoing embodiments, for example, a hard disk or an internal storage of the switching device. The switching device readable storage medium may alternatively be an external storage device of the switching device, for example, a removable hard disk, a smart media card (Smart Media Card, SMC), a secure digital (Secure Digital, SD) card, a flash card (Flash Card), or the like that is provided on the switching device. Further, the switching device readable storage medium may alternatively include both the internal storage unit and the external storage device of the switching device. The computer readable storage medium is configured to store the program and other programs and data required by the computer. The computer readable storage medium may be further configured to temporarily store data that has been output or is to be output.

Based on a same inventive concept, problem-resolving principles of the switching device provided in the embodiments of the present invention are similar to those of the method embodiments of the present invention. Therefore, for implementation of the switching device, reference may be made to the implementation of the method. For brevity of description, details are not described herein again.

What is claimed is:

1. A flexible-Ethernet data processing method, comprising:
　　acquiring a to-be-switched first client service flow, wherein the first client service flow is a service flow suitable for transmission on a flexible Ethernet;
　　performing first rate adaptation from a source clock domain to a target clock domain on the first client service flow to obtain a second client service flow that matches the target clock domain, wherein the target clock domain comprises a switching circuit clock domain; and
　　performing serial-to-parallel conversion on the second client service flow in the target clock domain to obtain a parallel client slot flow, wherein the parallel client slot flow includes a plurality of parallel slots having a same bandwidth capacity.

2. The method according to claim 1, wherein after performing the serial-to-parallel conversion on the second client service flow in the target clock domain to obtain the parallel client slot flow, the method further comprises:
　　performing space division switching on the parallel client slot flow;
　　outputting a parallel client slot flow obtained after the space division switching; and
　　performing parallel-to-serial conversion on the parallel client slot flow obtained after the space division switching to restore, to the second client service flow, the parallel client slot flow obtained after the space division switching.

3. The method according to claim 2, wherein after performing the parallel-to-serial conversion on the parallel client slot flow obtained after the space division switching to restore, to the second client service flow, the parallel client slot flow obtained after the space division switching, the method further comprises:
　　performing second rate adaptation on the second client service flow; and
　　sending the second client service flow that has undergone the second rate adaptation.

4. The method according to claim 2, wherein performing the space division switching on the parallel client slot flow comprises:
　　performing the space division switching on the parallel client slot flow based on a preset crossing configuration table, wherein the preset crossing configuration table comprises a correspondence between an input interface and an output interface of the parallel client slot flow.

5. The method according to claim 2, wherein slots in the parallel client slot flow each correspond to a slot flow identifier, and wherein performing the parallel-to-serial conversion on the parallel client slot flow obtained after the space division switching comprises:
　　determining the slot flow identifiers respectively corresponding to the parallel slots in client slot flow obtained after the space division switching;
　　sorting, according to the corresponding slot flow identifiers, the parallel slots in the client slot flow obtained after the space division switching; and
　　performing, based on a result of the sorting, parallel-to-serial conversion on a plurality of parallel slots in the client slot flow obtained after the space division switching.

6. The method according to claim 1, wherein acquiring the to-be-switched first client service flow comprises:
　　acquiring an initial service flow; and
　　if the initial service flow meets a flexible Ethernet transmission condition, determining that the initial service flow is the to-be-switched first client service flow, wherein a source of the initial service flow is used to determine whether the initial service flow meets the flexible Ethernet transmission condition.

7. The method according to claim 6, further comprising:
　　if the initial service flow does not meet the flexible Ethernet transmission condition, performing first code conversion on the initial service flow according to a flexible Ethernet standard to obtain the to-be-switched first client service flow.

8. The method according to claim 1, wherein performing the first rate adaptation from the source clock domain to the target clock domain on the first client service flow to obtain the second client service flow that matches the target clock domain comprises:
　　performing the first rate adaptation from the source clock domain to the switching circuit clock domain on the first client service flow according to a rate adaptation standard to obtain the second client service flow that matches the target clock domain, wherein the rate adaptation standard comprises an IEEE 802.3 standard.

9. A switching device, wherein the switching device comprises:
at least one processor;
a transceiver, wherein the transceiver is configured to acquire a to-be-switched first client service flow, wherein the first client service flow is a service flow suitable for transmission on a flexible Ethernet; and
one or more memories coupled to the at least one processor and storing programming instructions for execution by the at least one processor to:
perform first rate adaptation from a source clock domain to a target clock domain on the first client service flow to obtain a second client service flow that matches the target clock domain, wherein the first client service flow and the source clock domain are located in a same first clock domain, wherein the target clock domain comprises a switching circuit clock domain, and wherein the second client service flow and the switching circuit clock domain are located in a same second clock domain; and
perform serial-to-parallel conversion on the second client service flow in the target clock domain to obtain a parallel client slot flow.

10. The switching device according to claim 9, wherein the programming instructions are for execution by the at least one processor to:
perform space division switching on the parallel client slot flow;
output a parallel client slot flow obtained after the space division switching; and
perform parallel-to-serial conversion on the parallel client slot flow obtained after the space division switching to restore, to the second client service flow, the parallel client slot flow obtained after the space division switching.

11. The switching device according to claim 10, wherein the programming instructions are for execution by the at least one processor to perform the space division switching on the parallel client slot flow based on a preset crossing configuration table, wherein the preset crossing configuration table comprises a correspondence between an input interface and an output interface of the parallel client slot flow.

12. The switching device according to claim 10, wherein the parallel client slot flow corresponds to a slot flow identifier, and wherein the programming instructions are for execution by the at least one processor to:
determine the slot flow identifier corresponding to the parallel client slot flow obtained after the space division switching;
sort, according to the corresponding slot flow identifier, the parallel client slot flow obtained after the space division switching; and
perform, based on a result of the sorting, parallel-to-serial conversion on a plurality of parallel client slot flows obtained after the space division switching.

13. The switching device according to claim 9, wherein the transceiver is configured to:
acquire an initial service flow; and
if the initial service flow meets a flexible Ethernet transmission condition, determine that the initial service flow is the to-be-switched first client service flow, wherein a source of the initial service flow is used to determine whether the initial service flow meets the flexible Ethernet transmission condition.

14. The switching device according to claim 13, wherein the transceiver is configured to if the initial service flow does not meet the flexible Ethernet transmission condition, perform first code conversion on the initial service flow according to a flexible Ethernet standard to obtain the to-be-switched first client service flow.

15. The switching device according to claim 13, wherein the transceiver is configured to:
perform second rate adaptation on the second client service flow; and
send the second client service flow that has undergone the second rate adaptation.

16. The switching device according to claim 9, wherein the transceiver is configured to perform the first rate adaptation from the source clock domain to the switching circuit clock domain on the first client service flow according to a rate adaptation standard to obtain the second client service flow that matches the target clock domain, wherein the rate adaptation standard comprises an IEEE 802.3 standard.

17. A non-transitory computer-readable storage media comprising instructions which, when executed by one or more processors, cause the one or more processors to perform operations comprising:
acquiring a to-be-switched first client service flow, wherein the first client service flow is a service flow suitable for transmission on a flexible Ethernet;
performing first rate adaptation from a source clock domain to a target clock domain on the first client service flow to obtain a second client service flow that matches the target clock domain, wherein the target clock domain comprises a switching circuit clock domain; and
performing serial-to-parallel conversion on the second client service flow in the target clock domain to obtain a parallel client slot flow, wherein the parallel client slot flow includes a plurality of parallel slots having a same bandwidth capacity.

18. The non-transitory computer-readable storage media according to claim 17, wherein after performing the serial-to-parallel conversion on the second client service flow in the target clock domain to obtain the parallel client slot flow, the operations further comprise:
performing space division switching on the parallel client slot flow;
outputting a parallel client slot flow obtained after the space division switching; and
performing parallel-to-serial conversion on the parallel client slot flow obtained after the space division switching to restore, to the second client service flow, the parallel client slot flow obtained after the space division switching.

19. The non-transitory computer-readable storage media according to claim 17, wherein acquiring the to-be-switched first client service flow comprises:
acquiring an initial service flow; and
if the initial service flow meets a flexible Ethernet transmission condition, determining that the initial service flow is the to-be-switched first client service flow, wherein a source of the initial service flow is used to determine whether the initial service flow meets the flexible Ethernet transmission condition.

20. The non-transitory computer-readable storage media according to claim 19, the operations further comprising:
if the initial service flow does not meet the flexible Ethernet transmission condition, performing first code conversion on the initial service flow according to a flexible Ethernet standard to obtain the to-be-switched first client service flow.

* * * * *